Aug. 14, 1923.

F. W. STRAEHLE

REAMER

Filed April 8, 1920

1,465,029

2 Sheets-Sheet 1

Inventor.
Frederick W. Straehle,
By Hull, Smith, Brock & West,
Attys.

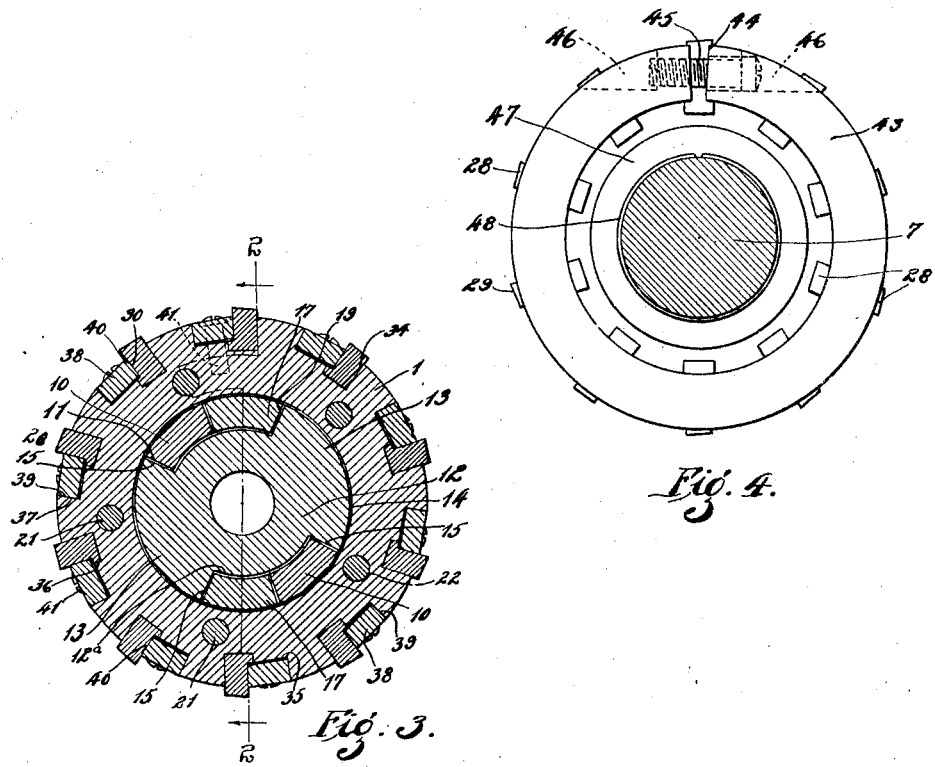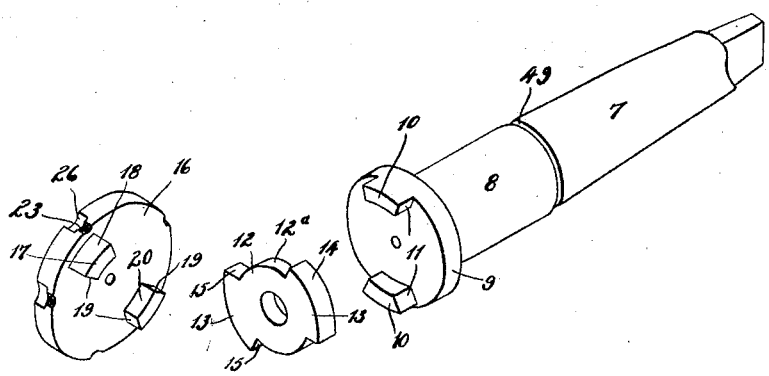

Patented Aug. 14, 1923.

1,465,029

UNITED STATES PATENT OFFICE.

FREDERICK W. STRAEHLE, OF CLEVELAND, OHIO.

REAMER.

Application filed April 8, 1920. Serial No. 372,131.

*To all whom it may concern:*

Be it known that I, FREDERICK W. STRAEHLE, a citizen of the United States, residing at Cleveland, in the county of Cuyahoga and State of Ohio, have invented a certain new and useful Improvement in Reamers, of which the following is a full, clear, and exact description, reference being had to the accompanying drawings.

Figure 1:
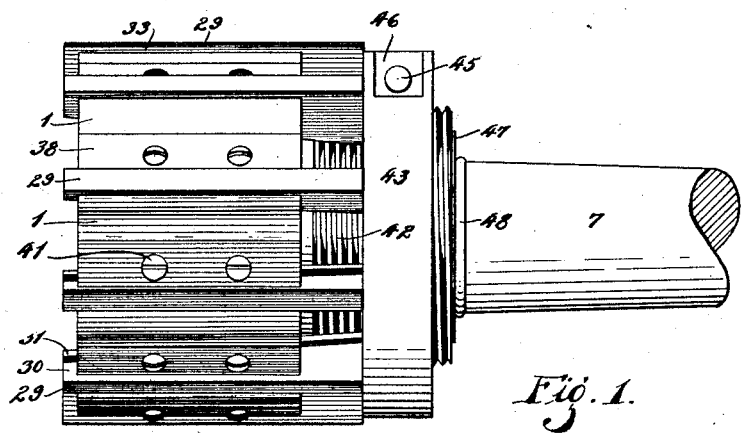
Figure 2:
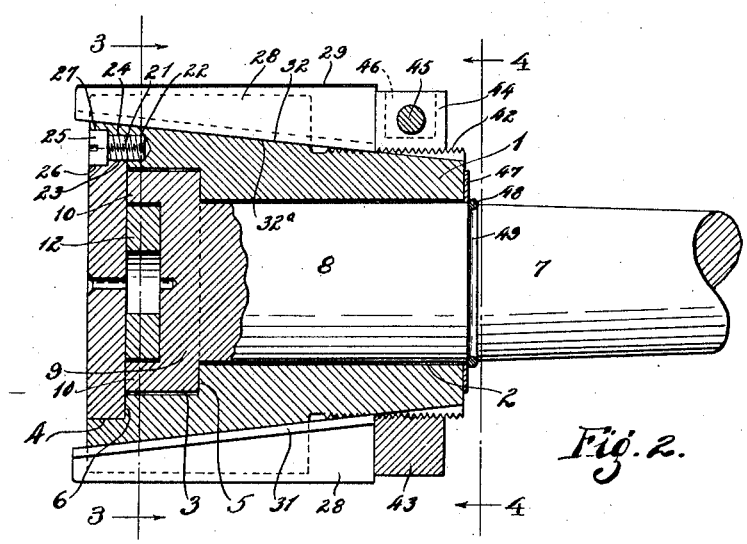
Figure 6:
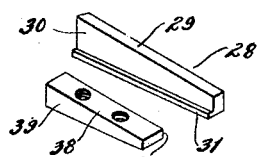

This invention relates to boring tools and more particularly to tools of the type that are known to the trade as "floating reamers." It is a general object of the invention to provide a construction whereby the connection between the power-driven shank or shaft and the reamer may be formed in close proximity to the front or cutting end of the latter, whereby the liability of the reamer to tilt or cramp in the bore, and thus wedge in the latter, is overcome. A further object of the invention is to provide means whereby the blades may be conveniently and effectively secured in place upon the reamer body; to provide means whereby the blades may be conveniently adjusted to compensate for wear; also to provide a simple and efficient dust-excluding joint between the operating shaft or shank and the reamer body. I secure these objects, and other and more limited objects which will appear hereinafter, in and through the construction shown in the drawings forming a part hereof, wherein Fig. 1 represents a side elevation of the reamer and its operating shank; Fig. 2 a longitudinal section through the said reamer, corresponding to the line 2—2 of Fig. 3, a portion of one blade and a portion of the shank being shown in elevation; Fig. 3 a sectional view corresponding to the line 3—3 of Fig. 2 looking in the direction of the arrows; Fig. 4 a similar view corresponding to the line 4—4 of Fig. 2 and looking in the direction of the arrows; Fig. 5 a detail in perspective of the shank and the cooperating members for securing the floating connection between the said shank and the reamer body; and Fig. 6 a detail in perspective of one of the reamer blades and the block cooperating therewith for securing the former to the reamer body.

Describing the various parts by reference characters, 1 denotes the reamer body, the said body having a cylindrical bore 2 extending from the rear end of the body toward the front end thereof. Near the front end of the body, this bore is enlarged, as shown at 3, to provide a cylindrical extension of the same and, at the extreme front end of the body, the bore is still further enlarged, as indicated at 4, to provide an annular recessed seat at the front of said body. Annular shoulders 5 and 6 are interposed between the bore sections 2 and 3, and 3 and 4, respectively.

Mounted in the bore sections 2 and 3 is the operating shaft or shank. This shaft or shank is indicated generally at 7, is provided with a cylindrical portion 8 which is loosely mounted within the bore section 2, and is provided at its front end with a cylindrical head 9 which is loosely mounted within the bore section 3. In ordinary practice, there will be a clearance of about 1/64 inch between the portions 8 and 9 of the shank and the surrounding cylindrical walls of the bore sections 2 and 3, respectively, this clearance being sufficient, in most cases, to permit of the self-adjustment of the reamer within the work bore.

The head 9 is provided at its front end with a pair of diametrically opposed lugs 10, each lug being formed as a segment of a ring having its outer and inner surface concentric with the axis of the shank 7. Each lug 10 is slightly less than 45 degrees in angular extent and is provided with lateral faces 11 each in a plane of a radius drawn from the axis of the shank.

Cooperating with the lugs or shoulders 10 is a floating drive plate 12. This plate is provided with a pair of segmental projections 13 each having an outer cylindrical face 14 concentric with the axis of the shank 7 and adapted, when applied to the head 9, to provide a clearance of approximately 1/64 inch with the bore section 3. Each of these projections 13 is preferably 90 degrees in angular extent and each is provided with a pair of lateral faces 15, each located in the plane of a radius drawn from the axis of the said shank. The lateral faces 15 are connected by a pair of opposed cylindrical surfaces 12ª concentric with the axis of the shank 7.

In order to secure a driving connection between the shank 7, block 12, and the reamer body, I provide a plate 16 which is adapted to be fitted within the recess 4 and to be secured to said body, the said plate being provided with a pair of lugs 17 cooperating with the projections 13 and the driving lugs 10. Each lug 17 is provided with a cylindrical surface 18, slightly less than 45 degrees in extent and each having lateral faces 19, each of said faces being in the plane of a radius drawn from the axis of the shank. The inner face 20 of each of these lugs is also cylindrical, and the lugs are preferably of the same thickness as the lugs 10, providing a like clearance between the outer and inner faces thereof and the bore section 3 and the cylindrical surface 12$^a$ of the block 12, respectively.

The plate 16 is secured in place by means of bolts 21 threaded into suitable bores 22 in the reamer body. The body of each bolt is threaded into opposed sectional apertures 23 and 24 provided respectively in the outer cylindrical surface of the plate 16 and the adjacent portion of the reamer body, each bolt having a head 25 adapted to be seated within cooperating sectional apertures 26 and 27 formed in the block and the reamer body, respectively.

By the construction described, a particularly efficient floating connection is provided between the shank 7 and the reamer body, at the front or cutting end of the reamer. By making the projections 13 substantially 90 degrees in angular extent and spacing these projections substantially 90 degrees apart, with a capacity for adjustment between said projections and the lugs 10 and 17, I am enabled to secure freedom of movement along diameters that are 90 degrees apart; also to obtain all of the floating which is necessary for the successful operation of the reamer.

The exterior of the reamer body is provided with inclined slotted seats for the blades. One of these blades is indicated generally at 28 and is provided with the usual beveled cutting surface 29. Extending inwardly from this cutting surface is a clamping surface 30, the clamping surface, when the blade is assembled, extending radially with respect to the axis of the shank. Near the inner end of the blade, a shoulder 31 is provided, the base of the blade being wider than the exterior portion thereof. The seating surface 32 of each blade is tapered, to cooperate with a corresponding tapered surface 32$^a$ in the seat, the seats being provided at the inner ends of slots formed in the reamer body. The face 33 of each blade cooperates with a face 34 of its seat, the said faces extending parallel with a radius drawn from the axis of the shank through and including the face 30 of the blade. At one side of the blade-seating surface, there is a shallower seat having a tapered inner surface 35, there being a shoulder 36 interposed between the surface 35 and the surface 32$^a$. The shallower seat is provided with a lateral face 37 converging slightly toward the face 34, the projection of the face 37 not intersecting the axis of the shank or shaft.

For the purpose of securing the blades in place, I employ wedge blocks, each indicated generally at 38 and each having a face 39 adapted to bear against the face 37 and a face 40 adapted to bear against the face 30 of a blade, thereby to wedge the same against the face 34, the face 40 being preferably radial with respect to the axis of the shank. The locking or wedge plates are secured in place by means of screws, indicated at 41, the axis of each screw being parallel with the faces 37 and 39. By this construction and arrangement of parts, the blades will be wedged to their seats by the action of the faces 40 against the faces 30. Furthermore, the lock plates may be easily disengaged by removing the screws 41 extending into the reamer body.

For the purpose of adjusting the blades to compensate for wear, I provide the following construction: The rear end of the reamer body is threaded, as indicated at 42. Mounted upon this portion of the body is a ring, indicated generally at 43. This ring is split, as indicated at 44, and is adapted to be clamped upon the threaded portion of the body by means of a screw bolt 45 having its ends mounted in recesses 46 provided within the ring. The operating end of the screw is mounted loosely in its ring section, the other end being threaded into the opposite portion or section of the ring. As the blades become worn, the ring 43 may be rotated, first slacking up on the screw bolt 45, if necessary. The rotation of the ring forces the blades forwardly along their inclined seats, thereby spreading the blades radially. When the blades have been positioned, the ring may be locked in place by setting up on the screw 45.

In order to prevent the access of dust or any other material between the operating shank or shaft and the interior of the reamer body, I provide a flat ring 47 adapted to fit closely about the cylindrical portion 8 of said shank and to bear against the rear end of the reamer body. This ring is secured in place by means of a spring-wire ring 48 mounted in an annular groove 49 in the shank in such proximity to the ring 47 that the ring 49, when "snapped" into place, will engage the former ring.

Having thus described my invention, what I claim is:

1. In a tool of the character described, the combination of a revoluble body, one or more cutting members supported thereby, said body having a bore extending forwardly from the rear thereof and having an enlargement adjacent to the front of said body, a shaft or shank loosely mounted in said bore and having a head loosely mounted in such enlargement, the said head having a pair of diametrically opposed projections, a member secured to the front of said body and having a pair of diametrically opposed projections adapted to enter such enlargement, and a floating connecting member in said enlargement and having projections adapted to be engaged by the before-mentioned projections.

2. In a tool of the character described, the combination of a revoluble body, one or more cutting members supported thereby, said body having a bore extending from the rear toward the front thereof and provided adjacent to the front of said body with an enlargement and with a recess beyond said enlargement, a shaft or shank loosely mounted in said bore and having a head loosely mounted in said enlargement, said head being provided with a pair of diametrically opposed projections at the periphery thereof, said projections each being approximately 45° in extent, a plate detachably secured within said recess and having a pair of diametrically opposed projections adapted to enter such enlargement, each of such projections being substantially 45° in extent, and a plate loosely mounted in such enlargement and having a pair of diametrically opposed projections each substantially 90° in extent and arranged to be interposed between the driving projections on the head of the shaft or shank and the projections on said plate.

3. In a tool of the character described, the combination of a revoluble body, one or more cutting members supported thereby, said body having a bore extending from the rear toward the front thereof and provided adjacent to the front of said body with an enlargement, a shaft or shank loosely mounted in said bore and having a head loosely mounted in said enlargement, said head being provided with a pair of diametrically opposed projections at the periphery thereof, said projections each being approximately 45° in extent, a plate secured to said head and having a pair of diametrically opposed projections adapted to enter such enlargement, each of such projections being substantially 45° in extent, and a plate loosely mounted in such enlargement and having a pair of diametrically opposed projections each substantially 90° in extent and arranged to be interposed between the driving projections on the head of the shank or shaft and the projections on said plate.

4. In a tool of the character described, the combination of a revoluble body, one or more cutting members supported thereby, said body being provided with a bore extending forwardly from the rear end thereof, with an enlargement in front of said bore, and with a recess beyond said enlargement, a shank or shaft loosely mounted in said bore and having a head loosely mounted in such enlargement, the head being provided with a pair of diametrically opposed peripheral forwardly extending projections, each projection being substantially 45° in extent and each having lateral faces radial with respect to the axis of said shaft or shank, a plate detachably mounted within the said recess and having a pair of diametrically opposed projections adapted to enter such enlargement between the projections on such head, the projections on said plate being substantially 45° in angular extent and each having lateral faces radial with respect to the axis of said shaft or shank, and an intermediate member loosely mounted in said enlargement, the said intermediate member having a pair of opposed projections each substantially 90° in angular extent and each having lateral faces substantially radial with respect to the axis of said shaft or shank.

5. A tool of the character described, comprising a revoluble body having a plurality of slots extending longitudinally thereof, each slot having spaced tapered bottom walls, a lateral wall extending outwardly from one of such bottoms walls nearly parallel with a radius drawn from the axis of said body, each slot also having a second lateral wall extending outwardly from the other bottom wall, parallel with a radius drawn from such axis, the first wall being shorter than the second wall, a blade having a tapered seat adapted to cooperate with the lower bottom wall of each slot and having a radial face adapted to bear against the first mentioned lateral wall of such slot and a face which is radial with respect to the axis of said body, each such blade having a shouldered portion projecting laterally from the inner end of the last mentioned face thereof, a clamping block for each blade, each block having a tapered inner face and opposed lateral faces, one of said lateral faces being adapted to engage the second lateral face of its slot and the other face being radial with respect to the axis of said body and adapted to engage the radial face of its blade outside the shouldered portion thereof, and means for connecting each block to said body.

6. In a tool of the character described, the combination of a revoluble body having a bore extending forwardly from the rear end thereof, a shaft or shank loosely mounted in said bore, a ring surrounding the said shaft or shank and adapted to engage the rear of said body, the said shaft or shank having a recess at the rear of said ring, and a split resilient retaining ring mounted in said recess and adapted to engage the first mentioned ring.

7. In a tool of the character described, the combination of a revoluble body having a bore extending forwardly from the rear end thereof, a shaft or shank loosely mounted in said bore, a ring surrounding the said shaft or shank and adapted to engage the rear of said body, the said shaft or shank having a recess at the rear of said ring, and an expansible and contractible retaining ring mounted in said recess and adapted to engage the first mentioned ring.

In testimony whereof, I hereunto affix my signature.

FREDERICK W. STRAEHLE.